United States Patent
Tamura et al.

(10) Patent No.: US 10,731,704 B2
(45) Date of Patent: Aug. 4, 2020

(54) OIL-IMPREGNATED SINTERED BEARING AND PRODUCTION METHOD THEREFOR

(71) Applicant: Diamet Corporation, Niigata-shi (JP)

(72) Inventors: Yoshiki Tamura, Niigata (JP); Hideo Sakai, Niigata (JP); Osamu Sakai, Niigata (JP)

(73) Assignee: Diamet Corporation, Niigata-shi (JP)

(*) Notice: Subject to any disclaimer, the term of this patent is extended or adjusted under 35 U.S.C. 154(b) by 0 days.

(21) Appl. No.: 16/340,664

(22) PCT Filed: Oct. 18, 2017

(86) PCT No.: PCT/JP2017/037704
§ 371 (c)(1),
(2) Date: Apr. 9, 2019

(87) PCT Pub. No.: WO2018/074515
PCT Pub. Date: Apr. 26, 2018

(65) Prior Publication Data
US 2020/0049198 A1 Feb. 13, 2020

(30) Foreign Application Priority Data

Oct. 18, 2016 (JP) ................................. 2016-204110

(51) Int. Cl.
*F16C 17/02* (2006.01)
*F16C 33/02* (2006.01)
(Continued)

(52) U.S. Cl.
CPC ............ *F16C 33/128* (2013.01); *F16C 17/02* (2013.01); *F16C 33/145* (2013.01)

(58) Field of Classification Search
CPC ........ F16C 17/02; F16C 33/128; F16C 33/145
See application file for complete search history.

(56) References Cited

U.S. PATENT DOCUMENTS 7,553,445 B2 * 6/2009 Miyasaka ............ C22C 33/0207
419/2
8,360,648 B2 * 1/2013 Maruyama .............. F16C 17/02
384/279
(Continued)

FOREIGN PATENT DOCUMENTS

JP 02-094451 U 7/1990
JP 06-240301 A 8/1994
(Continued)

OTHER PUBLICATIONS

International Search Report dated Dec. 19, 2017 for the corresponding PCT International Application No. PCT/JP2017/037704.
(Continued)

*Primary Examiner* — Phillip A Johnson
(74) *Attorney, Agent, or Firm* — Leason Ellis LLP

(57) ABSTRACT

The oil-impregnated sintered bearing of the present invention is an oil-impregnated sintered bearing having a Fe—Cu-based sintered body being impregnated with, a bearing hole being formed in the Fe—Cu-based sintered body and configured to be penetrated by and support a rotating shaft, in which an inner circumferential surface of the bearing hole includes a first region forming a central portion in a shaft direction, a second region from a first end portion of the first region to a first opening of the bearing hole, and a third region from a second end portion of the first region to a second opening of the bearing hole, and an area ratio of the Cu phase of the second region in a center along the shaft direction is 80% or more and 100% or less of an area ratio of the Cu phase of the third region in a center along the shaft direction.

3 Claims, 10 Drawing Sheets

(51) Int. Cl.
*F16C 33/12* (2006.01)
*F16C 33/14* (2006.01)

(56) References Cited

U.S. PATENT DOCUMENTS

| | | | |
|---|---|---|---|
| 8,726,515 B2 * | 5/2014 | Maruyama | F16C 17/02 29/898.042 |
| 2002/0085775 A1 | 7/2002 | Mori et al. | |
| 2015/0139847 A1 * | 5/2015 | Ito | B22F 5/106 419/11 |
| 2016/0223016 A1 * | 8/2016 | Ito | F16C 33/124 |
| 2018/0112712 A1 * | 4/2018 | Yamashita | F16C 33/128 |

FOREIGN PATENT DOCUMENTS

| | | | | |
|---|---|---|---|---|
| JP | 08-019941 B | | 3/1996 | |
| JP | 09229067 A | * | 9/1997 | F16C 23/041 |
| JP | 2000-240653 A | | 9/2000 | |
| JP | 2004-308682 A | | 11/2004 | |
| JP | 2006-299347 A | | 11/2006 | |
| JP | 2014-025086 A | | 2/2014 | |
| JP | 2016-172900 A | | 9/2016 | |
| JP | 2016-173135 A | | 9/2016 | |
| JP | 2016-173138 A | | 9/2016 | |
| WO | WO-2015/050200 A1 | | 4/2015 | |
| WO | WO-2016/147925 A1 | | 9/2016 | |

OTHER PUBLICATIONS

International Preliminary Report on Patentability dated Sep. 11, 2018 for the corresponding PCT International Application No. PCT/JP2017/037704.
European Search Report dated Mar. 6, 2020 for the corresponding European Patent Application No. 17862373.2.

* cited by examiner

UPPER-SIDE IN MOLD

INTERNAL DIAMETER COPPER SURFACE AREA RATIO 60%

LOWER-SIDE IN MOLD

INTERNAL DIAMETER COPPER SURFACE AREA RATIO 55%

UPPER-SIDE IN MOLD

INTERNAL DIAMETER COPPER SURFACE AREA RATIO 60%

LOWER-SIDE IN MOLD

INTERNAL DIAMETER COPPER SURFACE AREA RATIO 40%

OIL-IMPREGNATED SINTERED BEARING AND PRODUCTION METHOD THEREFOR

CROSS-REFERENCE TO RELATED PATENT APPLICATIONS

This application is a U.S. National Phase Application under 35 U.S.C. § 371 of International Patent Application No. PCT/JP2017/037704, filed Oct. 18, 2017, and claims the benefit of Japanese Patent Application No. 2016-204110, filed on Oct. 18, 2016, all of which are incorporated herein by reference in their entirety. The International Application was published in Japanese on Apr. 26, 2018 as International Publication No. WO/2018/074515 under PCT Article 21(2).

FIELD OF THE INVENTION

The present invention relates to an oil-impregnated sintered bearing formed of a Fe—Cu-based sintered metal and a production method therefor.

BACKGROUND OF THE INVENTION

In an oil-impregnated sintered bearing, the inside of a sintered body is impregnated with a lubricant in advance, the oil is caused to flow out by a pumping action by the rotation of a shaft and thermal expansion by friction heat, and a friction surface is lubricated. Such oil-impregnated sintered bearings can be used for a long period of time with no refueling and are thus being broadly employed as bearings for rotating shafts for automobiles, home appliances, acoustic devices, and the like (for example, refer to Japanese Examined Patent Application, Second Publication No. H8-19941).

In the case of supporting a rotating shaft using an oil-impregnated sintered bearing of the related art, for example, when a torque is transmitted to rotate the rotating shaft in a certain direction, a load in a shear direction is applied to the rotating shaft. At this time, when the shear load is extremely large or the stiffness of the rotating shaft is not high enough, the rotating shaft bends due to the shear load and rotates with the shaft line inclined inside the bearing, and there is a possibility that a state in which the surface of the rotating shaft does not properly come into contact with the friction surface inside the bearing (a motion of the rotating shaft hollowing the inner surface of the bearing) may be caused. When such a state is caused, the rotating shaft receives a strong resistance and is not capable of readily rotating, and the bearing does not sufficiently perform the function. In addition, when such a state is repeatedly caused, it can be also considered that the durability of the rotating shaft or the bearing degrades.

In order to overcome the disadvantage of the rotating shaft incapable of properly coming into contact with the friction surface inside the bearing in the case of receiving a load in a shear direction as described above, for example, an oil-impregnated sintered bearing including a straight hole portion having a constant diameter and an enlarged diameter portion having a diameter that increases outwards and forming a tapered shape in a bearing hole is known (for example, refer to Japanese Unexamined Patent Application, First Publication No. 2004-308682).

A majority of oil-impregnated sintered bearings are formed of an iron (Fe)-copper (Cu)-based sintered metal. The Fe component is suitable for an operation state in which the rotation speed of the rotating shaft is slow and the load being applied to the rotating shaft is high. On the other hand, the Cu component is suitable for an operation state in which the rotation speed of the rotating shaft is fast and the load being applied to the rotating shaft is low.

In response to the recent increase in resource prices, particularly, a price increase of Cu, there has been a demand for additional cost reduction of products including Cu. Therefore, there has been another demand for oil-impregnated sintered bearings capable of dealing with the fast rotation speed of rotating shafts while decreasing the amount of Cu used. As oil-impregnated sintered bearing for which the amount of Cu used is decreased, Fe—Cu-based sintered metal bearings for which Cu-based flat raw material powder is used are being broadly used (for example, refer to Japanese Unexamined Patent Application, First Publication No. 2006-299347).

Technical Problem

In the related art, in the production of an oil-impregnated sintered bearing made of a Fe—Cu-based sintered metal for which the above-described Cu-based flat raw material powder is used, a mold is installed so that a shaft direction lies in the vertical direction, and a powder mixture made up of Fe powder and Cu powder is loaded from an upper side of a cavity into which a core rod has been inserted.

However, oil-impregnated sintered bearings shaped as described above have a problem in that, in an inner circumferential surface of a bearing hole, the areas of a Cu phase differ in a region that was an upper side and a region that was a lower side during shaping. In particular, bearings having a high ratio of Fe are affected by the above-described problem. This is attributed to a phenomenon in which the amount of the Cu powder being attached to the surface of the core rod is likely to increase as the amount of the powder mixture dropping along the surface of the core rod increases.

That is, when the powder mixture is loaded into the cavity of the mold through which the core rod has been penetrated, the lower side of the cavity is first buried by the powder mixture in the initial phase of the loading. On the other hand, in the upper side of the cavity, the powder mixture continuously drops along the surface of the core rod for a longer period of time than in the lower side, and a larger amount of the Cu powder is attached to the surface of the core rod than in the lower side. Therefore, in the inner circumferential surface of the bearing hole, the area occupied by the Cu phase increases as the region comes closer to the upper side during shaping. In addition, in a region which became the lower side during shaping and in which the area occupied by the Cu phase is small, there has been a problem with durability when the rotating shaft is rotated at a high speed. Particularly, the problem of the above-described unevenness of the Cu phase is significant when Cu foil powder is used.

In addition, in Fe—Cu-based sintered bearings of the related art, the areas occupied by the Cu phase significantly differ between a portion of the cavity that was the upper side and a portion that was the lower side during shaping, and local abrasion or the like is caused when the rotating shaft is rotated at a high speed. For example, in a Fe—Cu-based sintered bearing in which the ratio between Fe and Cu is approximately 80:20, the areas occupied by the Cu phase in the upper side and the lower side of the cavity are approximately 60% in the upper side and approximately 40% in the lower side, and the area ratio of the lower side to the area occupied by the Cu phase in the upper side is approximately 70% in many bearings.

The present invention has been made in consideration of the above-described circumstances, and an object of the present invention is to provide an oil-impregnated sintered bearing for which a Fe—Cu-based sintered metal including Cu-based flat raw material powder is used and in which the uneven distribution of a Cu phase in an inner circumferential surface of a bearing hole is decreased, whereby both bearing performance in a slow rotation and high load state and bearing performance in a fast rotation and low load state can be enhanced to the maximum extent and stabilized sliding properties can be obtained.

SUMMARY OF THE INVENTION

Solution to Problem

That is, an oil-impregnated sintered bearing that is an aspect of the present invention has the following configuration.

An oil-impregnated sintered bearing having a Fe—Cu-based sintered body being impregnated with, a bearing hole being formed in the Fe—Cu-based sintered body and configured to be penetrated by and support a rotating shaft, in which an inner circumferential surface of the bearing hole includes a first region forming a central portion in a shaft direction, a second region from a first end portion of the first region to a first opening of the bearing hole, and a third region from a second end portion of the first region to a second opening of the bearing hole, in the second region and the third region, a Cu phase formed of Cu powder including Cu-based flat raw material powder is formed, and an area ratio of the Cu phase of the second region in a center along the shaft direction is 80% or more and 100% or less of an area ratio of the Cu phase of the third region in a center along the shaft direction.

In the bearing that is the aspect of the present invention, in the inner circumferential surface of the bearing hole, the area ratio of the Cu phase in the central portion of the second region is set to 80% or more and 100% or less of that in the central portion of the third region. For example, the area ratio of the Cu phase does not significantly change across the entire region of the inner circumferential surface of the bearing hole from the first opening to the second opening.

Therefore, for example, when the rotating shaft is rotated at a high speed, it is possible to reliably prevent the local abrasion of the inner circumferential surface of the bearing hole that is configured to receive the rotating shaft or a local increase in the friction force. Therefore, it is possible to realize a bearing capable of enhancing both bearing performance in a slow rotation and high load state and bearing performance in a fast rotation and low load state to the maximum extent. In addition, in the inner circumferential surface of the bearing hole, a significant change in the area ratio of the Cu phase is suppressed, whereby the amount of Cu, which has a high material cost, used is decreased, and it becomes possible to produce bearings at a low cost.

In the oil-impregnated sintered bearing that is the aspect of the present invention, the bearing hole includes a straight hole portion that is formed in the first region and has a constant diameter and an enlarged diameter portion that is formed in at least one or both of the second region and the third region, continues from the straight hole portion, has a diameter that increases outwards, and forms a tapered shape.

In the oil-impregnated sintered bearing that is the aspect of the present invention, in the first region, the Cu phase formed of Cu powder including Cu-based flat raw material powder is formed, and an area occupied by the Cu phase relative to an area of the inner circumferential surface in a center along the shaft direction of the first region is 50% or more.

A production method for an oil-impregnated sintered bearing that is another aspect of the present invention has the following configuration.

A production method for the oil-impregnated sintered bearing according to each of the paragraphs described above includes at least a material loading step of loading a powder mixture including an Fe powder and a Cu powder including Cu-based flat raw material powder into a cavity of a mold from an upper side in a vertical direction and a core rod sliding step of sliding a core rod that is configured to penetrate into the cavity and shape the bearing hole along the vertical direction in the cavity.

In a case where the powder mixture is simply dropped from the upper side of the cavity in the vertical direction in the material loading step, the amount of the Cu powder being attached to the surface of the core rod increases toward the upper side of the cavity. However, in the present invention, the core rod sliding step of sliding the core rod upwards in the cavity is carried out together with the material loading step, whereby the disposition of the Cu powder is adjusted even in the lower side of the cavity.

That is, the core rod sliding step is a step of collecting the Cu powder in a portion with which the core rod comes into contact in the cavity and adjusting the disposition of the Cu powder. Therefore, in a surface side of the core rod for shaping the bearing hole, the disposition of the Cu powder is adjusted from the lower side through the upper side of the cavity.

In a bearing obtained through the above-described steps, the area ratio of the Cu phase has been adjusted not to change significantly throughout the entire inside surface of the bearing hole by the core rod sliding step, and even when the rotating shaft is rotated at a high speed, it is possible to reliably prevent the local abrasion of the inner circumferential surface of the bearing hole that is configured to receive the rotating shaft or a local increase in the friction force.

In addition, in the production method for an oil-impregnated sintered bearing that is the other aspect of the present invention, the core rod sliding step is a step of collecting the Cu powder in a portion with which the core rod comes into contact in the cavity.

In addition, in the production method for an oil-impregnated sintered bearing that is the other aspect of the present invention, Cu foil powder is used as the Cu powder.

Advantageous Effects of Invention

According to the present invention, it becomes possible to provide an oil-impregnated sintered bearing for which a Fe—Cu-based sintered metal is used and in which the uneven distribution of a Cu phase in an inner circumferential surface of a bearing hole is decreased, it is possible to reliably prevent the local abrasion of the inner circumferential surface of the bearing hole that is configured to receive a rotating shaft or a local increase in the friction force, and stabilized sliding properties can be obtained.

DETAILED DESCRIPTION OF THE INVENTION

Hereinafter, oil-impregnated sintered bearings that are embodiments to which the present invention is applied will be described with reference to drawings. The respective embodiments described below are specific description for the better understanding of the gist of the invention, and, unless particularly otherwise described, the embodiments do not limit the present invention. In addition, drawings to be used in the following description show main portions in an enlarged or emphasized manner in some cases for convenience in order to facilitate the understanding of the characteristics of the present invention, and the dimensional ratios, angles, and the like of individual configurational elements are not always equal to those of actual cases.

(Oil-impregnated Sintered Bearing: First Embodiment)

Figure 1:
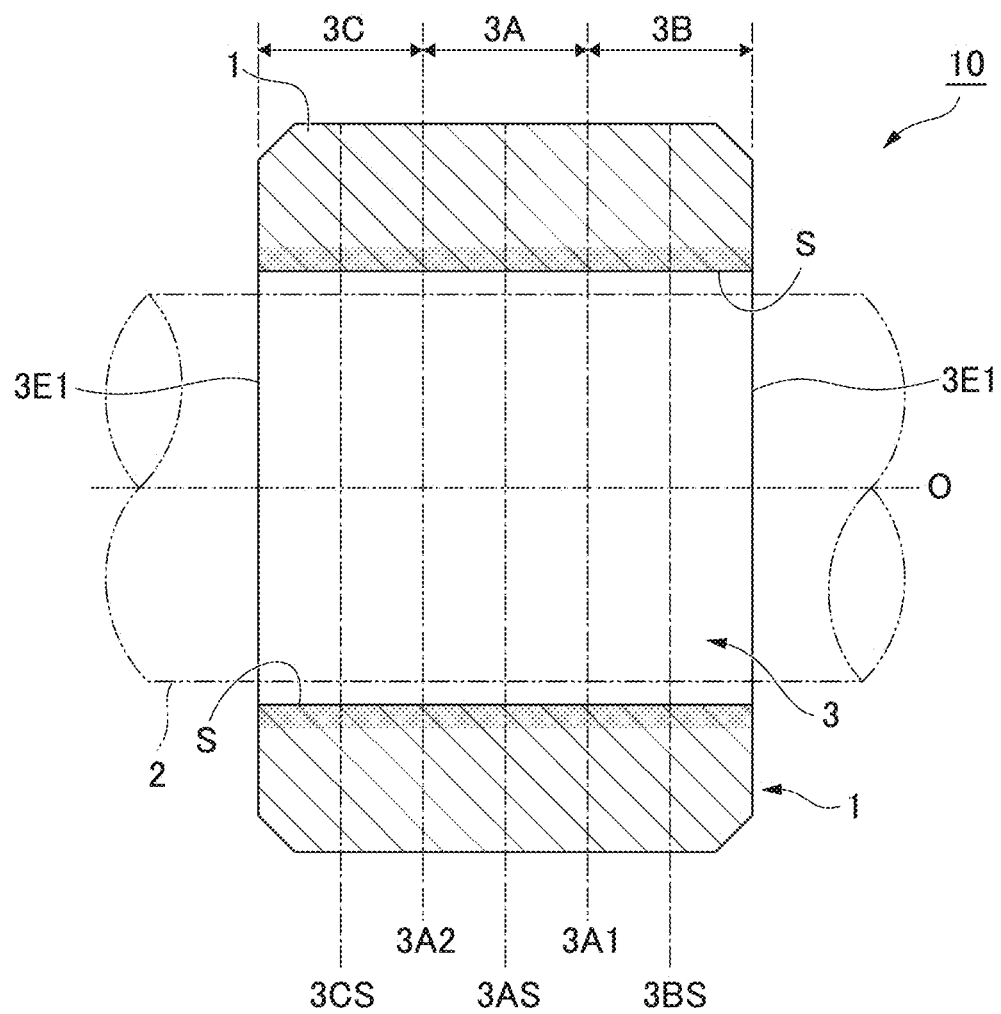
FIG. 1 is a cross-sectional view showing an oil-impregnated sintered bearing according to a first embodiment of the present invention.

An oil-impregnated sintered bearing according to a first embodiment will be shown in FIG. 1 and described.

FIG. 1 is a cross-sectional view of the oil-impregnated sintered bearing according to the first embodiment of the present invention along a shaft direction of a rotating shaft.

In an oil-impregnated sintered bearing (hereinafter, simply regarded as the bearing) 10, a bearing hole 3 into which a rotating shaft 2 is scheduled to be inserted is provided inside a bearing main body (sintered body) 1 formed of a Fe—Cu-based sintered metal.

The bearing main body (sintered body) 1 is formed of a Fe—Cu-based sintered metal (Fe—Cu-based sintered body). Specifically, Fe powder and Cu powder including Cu-based flat raw material powder are introduced into a mold having a core rod inserted into a cavity, and a Fe—Cu-based sintered body is shaped, thereby providing the bearing main body 1 including the bearing hole 3. A production method for the above-described bearing 10 will be described below.

The cross-sectional shape of the bearing hole 3 in a surface orthogonal to a shaft line O in the longitudinal direction of the rotating shaft 2 forms a circular shape, and the inner diameter of the bearing hole is set to be constant throughout the entire length along the shaft line O. In the present invention, in an inner circumferential surface S of the bearing hole 3, a first region 3A forming a central portion along the shaft line O, a second region 3B forming a first end portion 3A1 of the first region 3A through a first opening 3E1 of the bearing hole 3, and a third region 3C forming a second end portion 3A2 of the first region 3A through a second opening 3E2 of the bearing hole 3 are set.

In the present embodiment, the first region 3A, the second region 3B, and the third region 3C set in the inner circumferential surface S of the bearing hole 3 are set to evenly trisect the entire length of the bearing hole 3 along the shaft line O. The first region 3A, the second region 3B, and the third region 3C can be set to divide the entire length of the bearing hole 3 along the shaft line O at random proportions.

For example, in terms of the length along the shaft line O, it is possible to set the first region 3A to be longest and set the second region 3B and the third region 3C to be shorter than the first region or, conversely, it is possible to set the first region 3A to be shortest and set the second region 3B and the third region 3C to be longer than the first region.

There is neither clear compartment line nor significant difference in composition in a boundary between any two regions of the first region 3A, the second region 3B, and the third region 3C, and these regions are set for convenience to define the distributions of a Fe phase and the Cu phase along the shaft line O described below.

In the above-described inner circumferential surface S of the bearing hole 3, the area ratio of the Cu phase in a central portion 3BS along the shaft line O of the second region 3B is set to 80% or more and 100% or less of that in the central portion 3CS along the shaft line O of the third region 3C. This shows that, in the inner circumferential surface S of the bearing hole 3, for example, in the entire region from the first opening 3E1 through the second opening 3E2, the area ratio of the Cu phase does not significantly decrease and changes up to a maximum of approximately 20%. The area ratio of the Cu phase in the central portion 3BS along the shaft line O of the second region 3B is preferably 90% or more and preferably 100% or less of the area ratio of the Cu phase in the central portion 3CS along the shaft line O of the third region 3C, but is not limited thereto.

The area ratio of the Cu phase in the central portion 3BS along the shaft line O of the second region 3B can be computed, for example, as described below. First, a photograph of a random place having the central portion 3BS along the shaft line O of the second region 3B in the center is captured at a magnification of 200 times. A grid frame (for example, a 2 mm-grid frame with 30 cells×40 cells) is overlaid on the captured photograph, and cells that are each occupied 50% or more by an iron matrix or a copper matrix are marked respectively. The total of the marked cells of the iron matrix and the copper matrix is regarded as the total number of marks, and the ratio of the cells of the copper matrix to the total number of marks is computed. In the present embodiment, the ratio of the cells of the copper matrix is computed as an area ratio of the Cu phase in the central portion 3BS along the shaft line O of the second region 3B.

The area ratio of the Cu phase in the central portion 3CS along the shaft line O of the third region 3C can also be computed in the same manner.

In addition, the area occupied by the Cu phase relative to the area of the inner circumferential surface S in a central portion 3AS of the first region 3A is set to 50% or more. When the area is below 50%, the ratio of Fe increases in the surface, and there is a concern that the friction coefficient may increase. The area mentioned herein refers to an area excluding pores and cavities. The area occupied by the Cu phase relative to the area of the inner circumferential surface S in the central portion 3AS of the first region 3A is preferably 80% or more and preferably 100% or less, but is not limited thereto.

In the first region 3A, the second region 3B, and the third region 3C, the area ratios of the Cu phase to the unit areas of at least the friction surfaces that are the respective surfaces thereof need to be in the above-described ranges, and, furthermore, a region in which the above-described area ratios of the Cu phase are maintained may extend from the surfaces in a predetermined thickness range.

The bearing 10 having the above-described configuration is used in a state in which, for example, the bearing main body 1 is impregnated with a lubricant and the rotating shaft 2 is inserted into the bearing hole 3.

In Fe—Cu-based sintered bearings of the related art, the areas occupied by the Cu phase significantly differ in a portion that has been in the upper side of the cavity during shaping and a portion that has been present in the lower side, and there have been cases where local abrasion or the like occurs during the high-speed rotation of rotating shafts.

In the bearing 10 of the present invention, in the inner circumferential surface S of the bearing hole 3, the area ratio of the Cu phase in the central portion 3BS of the second region 3B is set to 80% or more and 100% or less of the central portion 3CS of the third region 3C. Therefore, for example, a state in which the area ratio of the Cu phase does not significantly change throughout the entire region from the first opening 3E1 through the second opening 3E2 is caused.

Therefore, for example, when the rotating shaft 2 is rotated at a high speed, it is possible to reliably prevent the local abrasion of the inner circumferential surface S of the bearing hole 3 that is configured to receive the rotating shaft 2 or a local increase in the friction force. Therefore, it is possible to realize the bearing 10 enabling the rotating shaft 2 to enhance both bearing performance in a high load state and bearing performance in a fast rotation state to the maximum extent.

In addition, in the inner circumferential surface S of the bearing hole 3, a significant change in the area ratio of the Cu phase is suppressed, whereby the amount of Cu, which has a high material cost, used is decreased, and it becomes possible to produce the bearing 10 at a low cost.

(Oil-impregnated Sintered Bearing: Second Embodiment)

Figure 2:
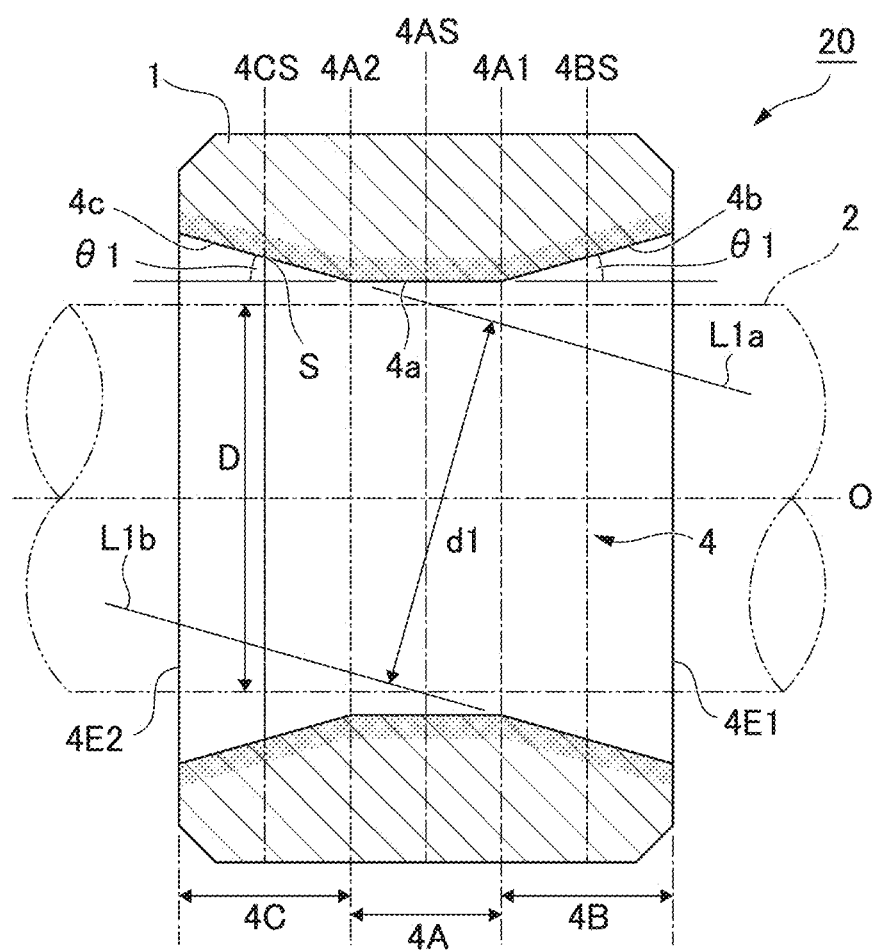
FIG. 2 is a cross-sectional view showing an oil-impregnated sintered bearing according to a second embodiment of the present invention.
Figure 3:
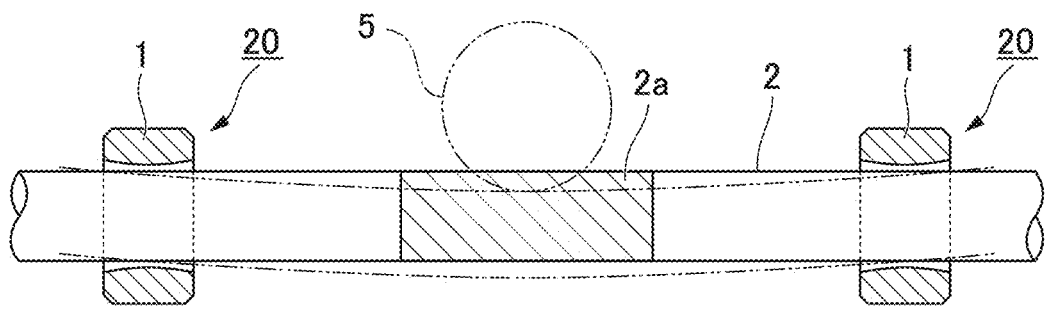
FIG. 3 is a cross-sectional view showing the oil-impregnated sintered bearing holding the rotating shaft.
Figure 4:
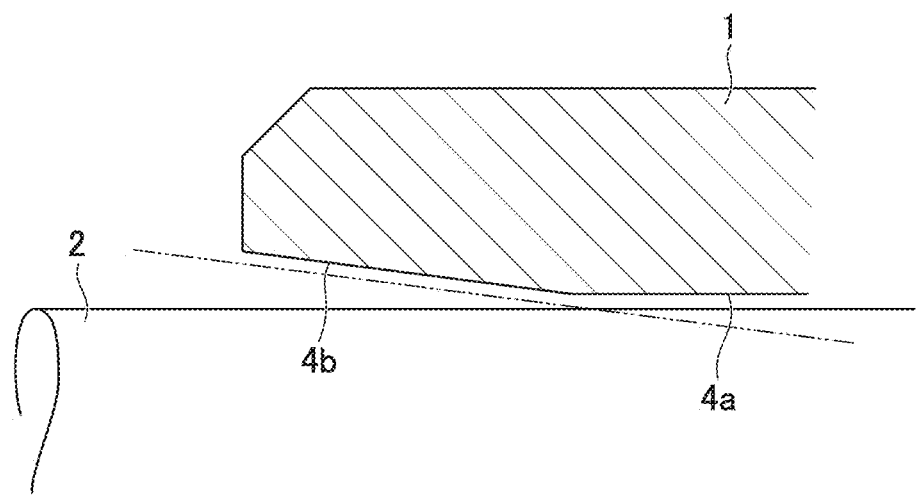
FIG. 4 is a main portion-enlarged cross-sectional view showing a main portion of the oil-impregnated sintered bearing in an enlarged manner.

An oil-impregnated sintered bearing according to a second embodiment will be shown in FIGS. 2 to 4 and described.

FIG. 2 is a cross-sectional view showing the oil-impregnated sintered bearing according to the second embodiment of the present invention along a shaft direction of a rotating shaft. In addition, FIG. 3 is a cross-sectional view showing a state in which the rotating shaft is held in the oil-impregnated sintered bearing shown in FIG. 2. In addition, FIG. 4 is a main portion-enlarged view showing a contact state between the oil-impregnated sintered bearing and the rotating shaft.

In an oil-impregnated sintered bearing (hereinafter, simply referred to as the bearing) 20, a bearing hole 4 into which the rotating shaft 2 is scheduled to be inserted is provided inside the bearing main body (sintered body) 1 formed of a Fe—Cu-based sintered metal.

The cross-sectional shape of the bearing hole 4 in a surface orthogonal to the shaft line O in the longitudinal direction of the rotating shaft 2 forms a circular shape, and, in an inner circumferential surface S of the bearing hole 4, a first region 4A forming a central portion along the shaft line O, a second region 4B forming a first end portion 4A1 of the first region 4A through a first opening 4E1 of the bearing hole 4, and a third region 4C forming a second end portion 4A2 of the first region 4A through a second opening 4E2 of the bearing hole 4 are set.

In the present embodiment, the first region 4A, the second region 4B, and the third region 4C set in the inner circumferential surface S of the bearing hole 4 are set to evenly trisect the entire length of the bearing hole 4 along the shaft line O. The first region 4A, the second region 4B, and the third region 4C can be set to divide the entire length of the bearing hole 4 along the shaft line O at random proportions.

In the first region 4A set in the inner circumferential surface S of the bearing hole 4, a straight hole portion 4a having a diameter that is slightly larger than the diameter of the rotating shaft 2 and having a diameter that is constant at any location in the longitudinal direction is provided. In addition, in the second region 4B and the third region 4C, enlarged diameter portions 4b and 4c that are provided continuously from the straight hole portion 4a on both sides in the longitudinal direction respectively, have a diameter that monotonously increases outwards, and forms a tapered shape are provided. In both of the enlarged diameter portions 4b and 4c, an angle (taper angle) θ1 formed by an inclined surface of the enlarged diameter portion and an inner surface of the straight hole portion 4a (or the shaft line O of the rotating shaft 2) parallel to the shaft direction of the bearing main body 1 is set to a random angle, for example, approximately 0.1° to 10°. This angle is preferably set in accordance with the bending angle of a shaft that is scheduled to be a sliding object. In FIG. 2, the angle is shown in the drawing in an exaggerated manner in order to clarify θ1.

When the bearing main body 1 is seen on a cross section along the shaft line O of the rotating shaft 2 (refer to FIG. 2), regarding the two enlarged diameter portions 4b and 4c present across the straight hole portion 4a, a straight line L1a extended from the inclined surface of the first enlarged diameter portion 4c in an inclination direction toward the center of the bearing main body 1 and a straight line L1b extended from the inclined surface of the second enlarged diameter portion 4b located at the opposite corner relative to the inclined surface of the first enlarged diameter portion 4c in an inclination direction toward the center of the bearing main body 1 are disposed parallel to each other. An interval d1 between both straight lines L1a and L1b is slightly larger than a diameter D of the rotating shaft 2 and almost equal to an inner diameter of the straight hole portion 4a.

The entire bearing main body (sintered body) 1 is formed of a Fe—Cu-based sintered metal (Fe—Cu-based sintered body). Specifically, Fe powder and Cu powder are introduced into a mold having a core rod inserted into a cavity, and a Fe—Cu-based sintered body is shaped, thereby shaping a sintered body including a through hole that is a straight hole as a whole. Furthermore, the diameter of the through hole in the sintered body is expanded up to a predetermined depth on both sides by sizing, thereby forming the bearing main body 1 including the straight hole portion 4*a* and the enlarged diameter portions 4*b* and 4*c*.

In the above-described bearing 20 of the second embodiment as well, in the inner circumferential surface S of the bearing hole 4, the area ratio of the Cu phase in a central portion 4B S along the shaft line O of the enlarged diameter portion 4*b* formed in the second region 4B is set to 80% or more and 100% or less of the area ratio of the Cu phase in a central portion 4CS along the shaft line O of the enlarged diameter portion 4*c* formed in the third region 4C. The area ratio of the Cu phase in the central portion 4BS along the shaft line O of the enlarged diameter portion 4*b* formed in the second region 4B is preferably 90% or more and preferably 100% or less of the area ratio of the Cu phase in the central portion 4CS along the shaft line O of the enlarged diameter portion 4*c* formed in the third region 4C, but is not limited thereto.

This shows that, in the inner circumferential surface S of the bearing hole 4, for example, in the entire region from the first opening 4E1 through the second opening 4E2 (the entire region from the enlarged diameter portion 4*b* through the enlarged diameter portion 4*c* across the straight hole portion 4*a*), the area ratio of the Cu phase does not significantly decrease and changes up to a maximum of approximately 20%. In addition, the area occupied by the Cu phase relative to the area of the inner circumferential surface S in a central portion 4AS of the straight hole portion 4*a* formed in the first region 4A is set to 50% or more. The area occupied by the Cu phase relative to the area of the inner circumferential surface S in the central portion 4AS of the straight hole portion 4*a* formed in the first region 4A is preferably 80% or more and preferably 100% or less, but is not limited thereto.

The bearing 20 having the above-described configuration is used in a state in which, for example, the bearing main body 1 is impregnated with a lubricant and the rotating shaft 2 is inserted into the bearing hole 4. FIG. 3 shows an example of a mechanism that is configured to support the rotating shaft 2 at two places using the bearings 20. In this mechanism, a screw gear 2*a* is formed on a circumference of the rotating shaft 2, both ends of the rotating shaft 2 are supported by the bearings 20, a screw gear 5 that is configured to be rotary-driven by a driving device, not shown, is engaged with the screw gear 2*a* on the rotating shaft 2 side, and the rotating shaft 2 is rotated by rotating the screw gear 5. In actual cases, the rotating shaft 2 does not bend as much as shown in FIG. 3; however, here, the bending is shown in an exaggerated manner in order to clarify the gist of the description.

When a relatively small torque is exerted to rotate the rotating shaft 2, the rotating shaft 2 seldom bends, and thus, as shown in FIG. 4, the surface of the rotating shaft 2 comes into contact with the straight hole portion 4*a*, and this portion is supported as the friction surface. In the straight hole portion 4*a*, the lubricant is caused to flow out from the inside of the bearing main body 1 by a pumping action by the rotation of the rotating shaft 2 and thermal expansion by friction heat, and the friction surface is lubricated.

On the other hand, when a large torque is transmitted to rotate the rotating shaft 2, a shear load exerted on the rotating shaft 2 is high, the rotating shaft 2 is strongly vibrated, and misalignment is about to occur. At this time, the vibration generated in the rotating shaft 2 causes the lubricant that lubricates the rotating shaft 2 and the straight hole portion 4*a* to be pushed out toward the first enlarged diameter portion 4*b* and the second enlarged diameter portion 4*c* and loaded into the space between the rotating shaft 2 and the enlarged diameter portion 4*b* and the space between the rotating shaft 2 and the enlarged diameter portion 4*c*. The lubricant loaded into the spaces between the rotating shaft 2 and the enlarged diameter portions 4*b* and 4*c* is pressurized by the vibration of the rotating shaft 2 so as to be pressed against the enlarged diameter portions 4*b* and 4*c*, but the enlarged diameter portions 4*b* and 4*c* have been provided to be dense, and thus the lubricant is not pressed into the inside of the bearing main body 1, instead, remains between the rotating shaft 2 and the enlarged diameter portions 4*b* and 4*c*, and exerts a repulsive force on the rotating shaft 2. This repulsive force suppresses the vibration of the rotating shaft 2 and prevents the misalignment of the rotating shaft 2 relative to the bearing.

However, in a case where the shear load exerted on the rotating shaft 2 is extremely high and the push-back action of the lubricant remaining between the rotating shaft 2 and the enlarged diameter portions 4*b* and 4*c* does not sufficiently function, the rotating shaft 2 is shaft-supported with the shaft line inclined inside the bearing main body 1. At this time, the surface of the rotating shaft 2 comes into contact with the enlarged diameter portions 4*b* and 4*c*, and this portion is supported as the friction surface. In the enlarged diameter portions 4*b* and 4*c* as well, similar to the straight hole portion 4*a*, the lubricant is caused to flow out from the inside of the bearing main body 1 by a pumping action by the rotation of the rotating shaft 2 and thermal expansion by friction heat, and the friction surface is lubricated.

In the bearing 20 of the present embodiment, in the inner circumferential surface S of the bearing hole 4, the area ratio of the Cu phase in the central portion 4BS of the enlarged diameter portion 4*b* is set to 80% or more and 100% or less of the central portion 4CS of the enlarged diameter portion 4*c*. Therefore, a state in which the area ratio of the Cu phase does not significantly change throughout the entire region from the enlarged diameter portion 4*b* through the enlarged diameter portion 4*c* across the straight hole portion 4*a* and the area ratio of the Cu phase does not significantly change is caused. Therefore, it becomes possible to rotate the rotating shaft 2 at a high speed even in any of a state in which the rotating shaft 2 comes into contact with the straight hole portion 4*a* without bending and a state in which the rotating shaft 2 bends and comes into contact with the enlarged diameter portions 4*b* and 4*c*. It becomes possible to reliably prevent the local abrasion of the inner circumferential surface S of the bearing hole 4 that is configured to receive the rotating shaft 2 in any of the straight hole portion 4*a* or the enlarged diameter portions 4*b* and 4*c* or a local increase in the friction force.

In addition, in the inner circumferential surface S of the bearing hole 4, a significant change in the area ratio of the Cu phase is suppressed, whereby the amount of Cu, which has a high material cost, used is decreased, and it becomes possible to produce the bearing 20 at a low cost.

In the above-described second embodiment, regarding the respective lengths along the shaft line O of the straight hole portion 4*a* formed in the first region 4A, the enlarged diameter portion 4*b* formed in the second region 4B, and the enlarged diameter portion 4*c* formed in the third region 4C which are set in the inner circumferential surface S of the bearing hole 4, the portions are provided to evenly trisect the entire length of the bearing hole 4, but can be formed so that the lengths along the shaft line O of the straight hole portion 4*a* and the enlarged diameter portions 4*b* and 4*c* have random proportions.

For example, in terms of the length along the shaft line O, it is also possible to set the straight hole portion 4*a* to be longest and set the enlarged diameter portions 4*b* and 4*c* to be shorter than the straight hole portion 4a or form all of the straight hole portion 4a and the enlarged diameter portions 4b and 4c in different lengths.

(Oil-impregnated Sintered Bearing: Third Embodiment)

Figure 5:
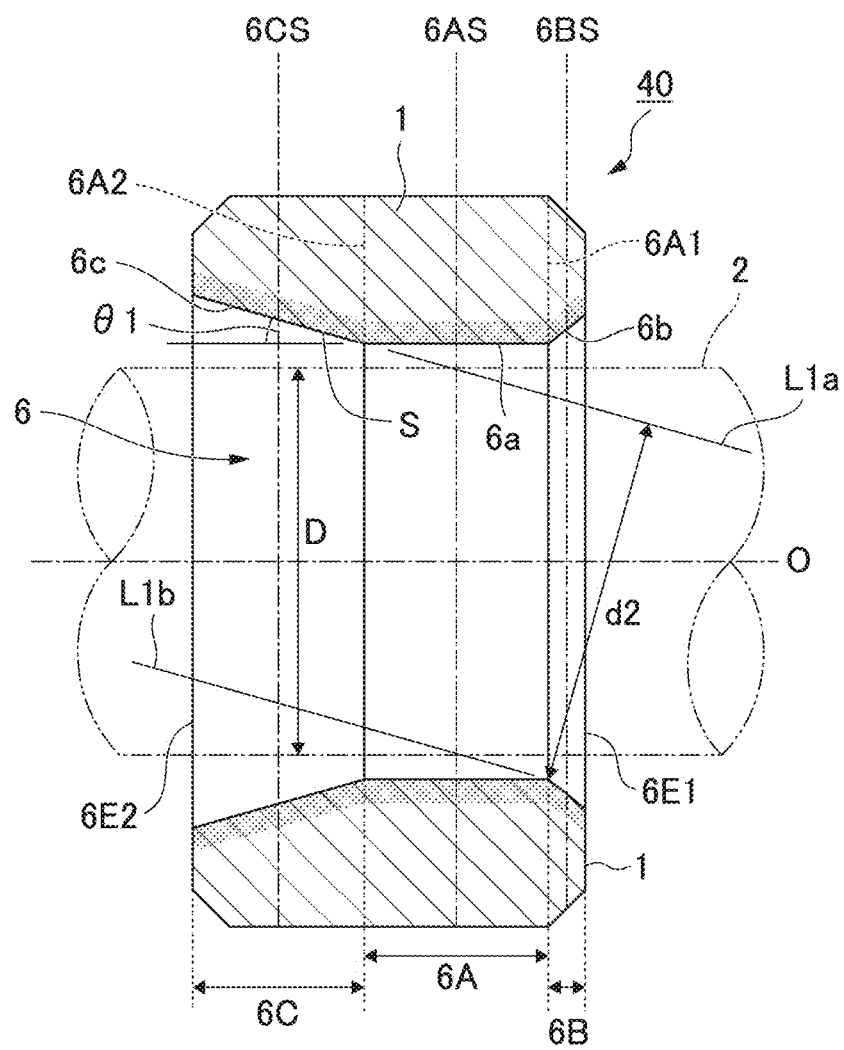
FIG. 5 is a cross-sectional view showing an oil-impregnated sintered bearing according to a third embodiment of the present invention.

An oil-impregnated sintered bearing according to a third embodiment will be shown in FIG. 5 and described.

FIG. 5 is a cross-sectional view of the oil-impregnated sintered bearing according to the third embodiment of the present invention along a shaft direction of a rotating shaft. In an oil-impregnated sintered bearing (hereinafter, simply regarded as the bearing) 40, a bearing hole 6 into which the rotating shaft 2 is scheduled to be inserted is provided inside the bearing main body (sintered body) 1 formed of a Fe—Cu-based sintered metal.

The cross-sectional shape of the bearing hole 6 in a surface orthogonal to the shaft line O in the longitudinal direction of the rotating shaft 2 forms a circular shape, and, in an inner circumferential surface S of the bearing hole 6, a first region 6A forming a central portion along the shaft line O, a second region 6B forming a first end portion 6A1 of the first region 6A through a first opening 6E1 of the bearing hole 6, and a third region 6C forming a second end portion 6A2 of the first region 6A through a second opening 6E2 of the bearing hole 6 are set.

Regarding the lengths along the shaft line O of the first region 6A, the second region 6B, and the third region 6C that are set in the inner circumferential surface S of the above-described bearing hole 6, the lengths of the first region 6A and the third region 6C are almost equal to each other, and the length of the second region 6B is set to be approximately ⅕ of the length of the first region 6A or the third region 6C.

In the first region 6A set in the inner circumferential surface S of the bearing hole 6, a straight hole portion 6a having a diameter that is slightly larger than the diameter of the rotating shaft 2 and having a diameter that is constant at any location in the longitudinal direction is provided. In addition, in the second region 6B and the third region 6C, enlarged diameter portions 6b and 6c that are provided continuously from the straight hole portion 6a on both sides in the longitudinal direction respectively, have a diameter that monotonously increases outwards, and forms a tapered shape are provided. In the enlarged diameter portion 6c, an angle (taper angle) θ1 formed by an inclined surface of the enlarged diameter portion and an inner surface of the straight hole portion 6a (or the shaft line O of the rotating shaft 2) parallel to the shaft direction of the bearing main body 1 is set to a random angle, for example, approximately 0.1° to 10°. This angle is preferably set in accordance with the bending angle of a shaft that is scheduled to be a sliding object.

The enlarged diameter portion 6b is provided as a chamfered portion and provided to facilitate the passing of the rotating shaft 2 mainly through the straight hole portion 6a and thus, generally, does not come into contact with the rotating shaft 2 even when the rotating shaft 2 is dislocated from the bearing main body 1. In the enlarged diameter portion 6b, an angle (taper angle) formed by an inclined surface of the enlarged diameter portion and an inner surface of the straight hole portion 6a (or the shaft line O of the rotating shaft 2) parallel to the shaft direction of the bearing main body 1 is preferably 30° to 180°, but is not limited thereto.

When the bearing main body 1 is seen on a cross section along the shaft line O of the rotating shaft 2 (refer to FIG. 5), regarding the two enlarged diameter portions 6b and 6c present across the straight hole portion 6a, a straight line L1a extended from the inclined surface of the first enlarged diameter portion 6c in an inclination direction toward the center of the bearing main body 1 and a straight line L1b extended from the inclined surface of the second enlarged diameter portion 6b located at the opposite corner relative to the inclined surface of the first enlarged diameter portion 6c in an inclination direction toward the center of the bearing main body 1 are preferably disposed parallel to each other. It is preferable that an interval d2 between both straight lines L1a and L1b is slightly larger than a diameter D of the rotating shaft 2 and almost equal to an inner diameter of the straight hole portion 6a, but is not limited thereto.

The entire bearing main body (sintered body) 1 is formed of a Fe—Cu-based sintered metal (Fe—Cu-based sintered body). Specifically, Fe powder and Cu powder are introduced into a mold having a core rod inserted into a cavity, and a Fe—Cu-based sintered body is shaped, thereby shaping a sintered body including a through hole that is a straight hole as a whole. Furthermore, the diameter of the through hole in the sintered body is expanded up to a predetermined depth on both sides by sizing, thereby forming the bearing main body 1 including the straight hole portion 6a and the enlarged diameter portions 6b and 6c.

In the above-described bearing 40 of the third embodiment as well, in the inner circumferential surface S of the bearing hole 6, the area ratio of the Cu phase in a central portion 6BS along the shaft line O of the enlarged diameter portion 6b formed in the second region 6B is set to 80% or more and 100% or less of the area ratio of the Cu phase in a central portion 6CS along the shaft line O of the enlarged diameter portion 6c formed in the third region 6C. The area ratio of the Cu phase in the central portion 6BS along the shaft line O of the enlarged diameter portion 6b formed in the second region 6B is preferably 90% or more and preferably 100% or less of the area ratio of the Cu phase in the central portion 6CS along the shaft line O of the enlarged diameter portion 6c formed in the third region 6C, but is not limited thereto.

This shows that, in the inner circumferential surface S of the bearing hole 6, for example, in the entire region from the first opening 6E1 through the second opening 6E2 (the entire region from the enlarged diameter portion 6b through the enlarged diameter portion 6c across the straight hole portion 6a), the area ratio of the Cu phase does not significantly decrease and changes up to a maximum of approximately 20%. In addition, the area occupied by the Cu phase relative to the area of the inner circumferential surface S in a central portion 6AS of the straight hole portion 6a formed in the first region 6A is set to 50% or more. The area occupied by the Cu phase relative to the area of the inner circumferential surface S in the central portion 6AS of the straight hole portion 6a formed in the first region 6A is preferably 80% or more and preferably 100% or less, but is not limited thereto.

(Production Method for Oil-impregnated Sintered Bearing)

Next, a production method for the oil-impregnated sintered bearing described in the first embodiment will be described.

FIG. 6A, FIG. 6B, FIG. 7A, and FIG. 7B are schematic cross-sectional views showing a production method for the oil-impregnated sintered bearing of the present invention stepwise.

In FIG. 6A, FIG. 6B, FIG. 7A, and FIG. 7B, the particles of Fe powder, Cu powder, Cu foil pieces, and the like are shown in an enlarged and schematic manner so as to be visible, but the particles do not reflect the actual particle sizes or the actual particle shapes.

Figure 6A:
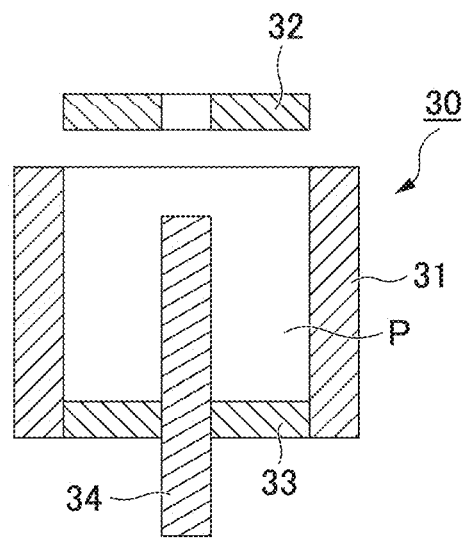
FIG. 6A is a schematic cross-sectional view showing a production method for the oil-impregnated sintered bearing of the present invention.

When the bearing 10 described in the first embodiment is produced, first, a mold for shaping the bearing (shaping die) 30 is prepared (refer to FIG. 6A). The mold 30 includes a die 31 having a cavity P formed therein, an upper punch 32, a lower punch 33, and a core rod 34 that is configured to penetrate through the cavity P and shape the bearing hole 3 (refer to FIG. 1).

Figure 6B:
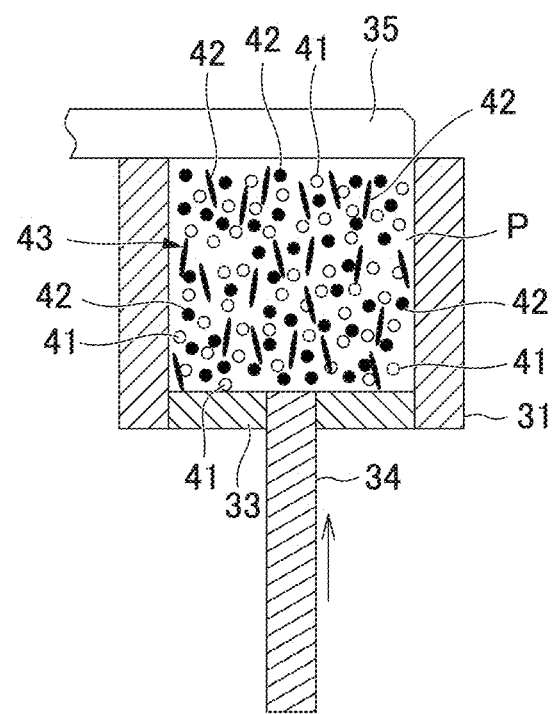
FIG. 6B is a schematic cross-sectional view showing the production method for the oil-impregnated sintered bearing of the present invention.

The lower punch 33 is fitted into the die 31 of the mold 30, and the core rod 34 is lowered up to the bottom of the cavity P. Next, as shown in FIG. 6B, a powder mixture 43 including Fe powder 41 and Cu powder 42 including Cu-based flat raw material powder (for example, Cu foil powder) is dropped from the upper side of the cavity P in the vertical direction through a shoebox 35, and the powder mixture 43 is loaded into the cavity P (material loading step). At this time, the core rod 34 is slidden in the cavity P at the same time along the vertical direction, for example, upwards (core rod sliding step).

The powder mixture 43 that is used in the present embodiment is formed by mixing, for example, the Fe powder 41 having an average particle size of 50 μm to 100 μm and the flat Cu powder 42 including Cu foil pieces having an average diameter of 50 μm to 100 μm and a thickness of approximately 1 μm to 10 μm. The mixing ratio between the Fe powder 41 and the Cu powder 42 including Cu-based flat raw material powder is, for example, in a range of 20:80 to 90:10 (weight ratio). As the mixing ratio of the Cu powder 42 increases, the area ratio of the Cu phase increases, and the difference of the area ratio of the Cu phase in the inside surface S of the bearing hole 3 decreases. As the flat Cu powder 42, a Cu—Zn-based alloy, a Cu—Sn-based alloy, or the like may be used.

Figure 7A:
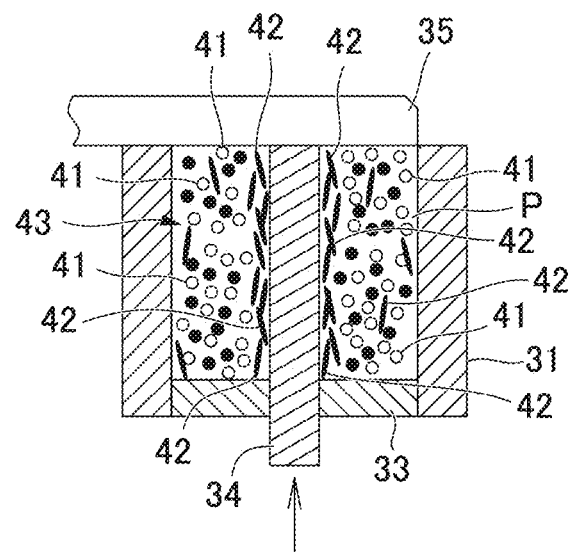
FIG. 7A is a schematic cross-sectional view showing the production method for the oil-impregnated sintered bearing of the present invention.

When the above-described powder mixture 43 is simply dropped from the upper side of the cavity P in the vertical direction in the material loading step, the amount of the Cu powder 42 is attached to the surface of the core rod 34 increases toward the upper side of the cavity P; however, in the present invention, the core rod sliding step of sliding the core rod 34 upwards in the cavity P is carried out together with the material loading step, and thus the disposition of the Cu powder (Cu foil pieces) 42 is also adjusted in the lower side of the cavity P (refer to FIG. 7A). That is, the core rod sliding step is a step of collecting the Cu powder 42, particularly, the Cu foil pieces in a portion with which the core rod 34 comes into contact in the cavity P and adjusting the disposition of the Cu powder. Therefore, on the surface of the core rod 34 for shaping the bearing hole 3, the disposition of the Cu powder 42 is adjusted from the lower side through the upper side of the cavity P.

Figure 7B:
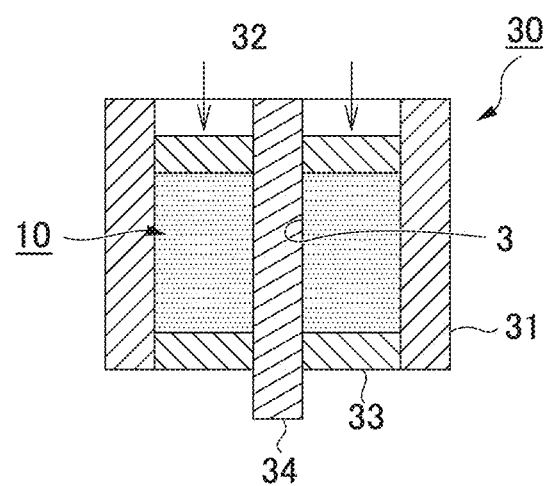
FIG. 7B is a schematic cross-sectional view showing the production method for the oil-impregnated sintered bearing of the present invention.

After that, the upper punch 32 is fitted into the cavity P as shown in FIG. 7B, and the interval between the upper punch and the lower punch 33 is pressed, thereby shaping the bearing 10 including the bearing hole 3 in the cavity P (shaping step).

In the bearing 10 obtained through the above-described steps, the area ratio of the Cu phase does not significantly change throughout the entire inside surface S of the bearing hole 3 by the core rod sliding step, and, even when the rotating shaft 2 (refer to FIG. 1) is rotated at a high speed, it is possible to reliably prevent the local abrasion of the inner circumferential surface S of the bearing hole 3 that is configured to receive the rotating shaft 2 or a local increase in the friction force.

In the core rod sliding step in the present embodiment, the core rod 34 is slidden upwards during the loading of the powder mixture 43 into the cavity P, but the core rod sliding step may be an operation in which, additionally, for example, the disposition of the Cu powder around the core rod 34 is adjusted by vertically moving the core rod 34 after the powder mixture 43 has been loaded into the cavity P. In addition, the core rod 34 may be slidden in the circumferential direction around the central axis of the core rod 34. The sliding direction or the number of times of sliding of the core rod 34 is not limited. In the core rod sliding step, the core rod 34 may be slidden vertically once or a plurality of times. Therefore, it is possible to mix the Fe powder 41 and the Cu powder 42 in the cavity P and selectively dispose the Cu powder 42 in the powder mixture 43 around the core rod. As a device for sliding the core rod 34, an air cylinder or a hydraulic cylinder can be used.

In the vertical sliding of the core rod 34, the core rod is preferably slidden so that the Cu powder sticks to the location of products (a pressurization portion) at the time of the completion of pressurization. In such a case, it is possible to improve the ratio of the Cu phase in the surface of the pressurization portion of the core rod 34 during pressurization. In addition, the core rod 34 is disposed so that the pressurization portion of the core rod 34 does not overlap the lower punch 33 during the loading of the powder mixture 43 into the cavity P. In a case where the pressurization portion of the core rod 34 overlaps the lower punch, there is a concern that it may be impossible to adhere the Cu powder to the pressurization portion of the core rod 34.

In the core rod sliding step, the Cu powder 42 is collected, and the Cu powder 42 is disposed in the portion with which the core rod 34 comes into contact, but the amount of the Cu powder 42 being disposed is not particularly limited. In products that have been subjected to the core rod sliding step, a Cu layer of several micrometers to several tens of micrometers is formed on the inner circumferential surface S of the bearing hole 3.

Hitherto, several embodiments of the present invention have been described, but these embodiments have been presented as examples and do not intend to limit the scope of the invention. These embodiments can also be carried out in a variety of other forms and can be omitted, substituted, or modified in various manners within the scope of the gist of the invention. These embodiments and modifications thereof are included in the scope of inventions described in the claims and equivalents thereof as if the embodiments and modifications thereof are included in the scope or gist of the invention.

EXAMPLES

Verification Example 1

A preferred ratio of the area ratio of the Cu phase relative in the central portion 3BS along the shaft line O of the second region 3B to the area ratio of the Cu phase relative in the central portion 3CS along the shaft line O of the third region 3C in the oil-impregnated sintered bearing 10 of the first embodiment shown in FIG. 1 was verified.

In the verification, oil-impregnated sintered bearings 10 as samples 1 to 4 in which the ratios of copper in measurement portions were set as shown in Table 1 below were produced. The sample 1 was produced by loading a powder mixture in which the mixing ratio was set to Fe-15 wt % Cu-2 wt % Sn into a cavity, sliding a core rod vertically in the cavity along the vertical direction, pressing upper and lower punches fitted into the cavity, and sintering the powder mixture. The sample 2 was produced in the same manner as the sample 1 except for the fact that a powder mixture in which the mixing ratio was set to Fe-20 wt % Cu-2 wt % Sn was used. The sample 3 was formed by loading a powder mixture in which the mixing ratio was set to Fe-25 wt % Cu-2 wt % Sn into a cavity, pressing upper and lower punches fitted into the cavity without sliding a core rod vertically in the cavity along the vertical direction, and sintering the powder mixture. The sample 4 was produced in the same manner as the sample 3 except for the fact that a powder mixture in which the mixing ratio was set to Fe-20 wt % Cu-2 wt % Sn was used. The column "MS portion" in Table 1 shows the area ratios (%) of the Cu phase in the central portion 3BS along the shaft line O of the second region 3B in the inner circumferential surface S of the bearing hole 3 in FIG. 1, and the column "3CS portion" in Table 1 shows the area ratios (%) of the Cu phase in the central portion 3CS along the shaft line O of the third region 3C. In addition, the column "3BS/3CS" shows the ratios (%) of the central portion 3BS to the central portion 3CS.

TABLE 1

|  | 3BS portion | 3CS portion | 3BS/3CS |
| --- | --- | --- | --- |
| Sample 1 | 50% | 50% | 100% |
| Sample 2 | 55% | 60% | 92% |
| Sample 3 | 55% | 70% | 79% |
| Sample 4 | 40% | 60% | 67% |

For the respective samples 1 to 4 described above, the friction coefficients were measured. In the measurement, a sliding test was carried out by rotating the rotating shaft 2 in a state in which a load was applied to a location 2 mm offset from the central portion 3AS along the shaft line O of the first region 3A toward the central portion 3BS along the shaft line O of the second region 3B in the oil-impregnated sintered bearing 10 shown in FIG. 1, and the friction coefficient was computed. The measurement conditions are as described below.

1. Circumferential speed of rotating shaft 2: 100 m/min
2. Load: 1 MPa
3. Measurement environment temperature: Room temperature
4. Rotation time: 1800 seconds The results of the verification example 1 carried out under the above-described conditions are shown in Table 2 and FIG. 8.

TABLE 2

|  | Friction coefficient |
| --- | --- |
| Sample 1 | 0.119 |
| Sample 2 | 0.113 |
| Sample 3 | 0.118 |
| Sample 4 | 0.143 |

Figure 8:
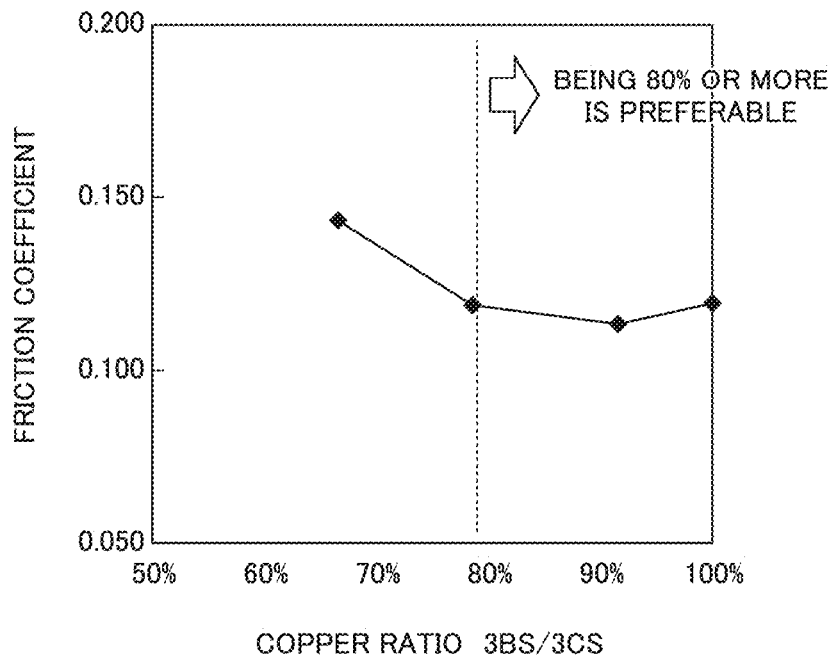
FIG. 8 is a graph showing results of a verification example 1.

According to the results of the verification example 1 shown in Table 2 and FIG. 8, it was confirmed that the friction coefficient of the sample 4 was significantly higher than those of the samples 1 to 3 and an effect for decreasing the friction coefficient could be obtained by setting the ratio of the Cu phase in the central portion 3BS to the central portion 3CS in the oil-impregnated sintered bearing 10 shown in FIGS. 1 to 80% or more. In addition, in the sample 3, the core rod sliding step was not carried out, but the ratio of the Cu powder in the powder mixture was as high as 25%, and thus the ratio of the Cu phase in the central portion 3BS to the central portion 3CS in the oil-impregnated sintered bearing 10 reached 79%.

Verification Example 2

A preferred ratio of the area occupied by the Cu phase relative to the area of the inner circumferential surface S in the central portion 3AS of the first region 3A in the oil-impregnated sintered bearing 10 of the first embodiment shown in FIG. 1 was verified.

In the verification, oil-impregnated sintered bearings 10 as samples 5 to 7 in which the ratios of copper in measurement portions were set as shown in Table 3 below were produced. The column "3AS portion" in Table 3 shows the ratios (%) of the areas occupied by the Cu phase relative to the areas of the inner circumferential surfaces S in the central portions 3AS of the first regions 3A in the inner circumferential surface S of the bearing hole 3 of FIG. 1. In addition, the ratios between Fe and Cu in specimens used in the verification were approximately 50:50 in the sample 5, approximately 85:15 in the sample 6, and approximately 95:5 in the sample 7. On the samples 5 to 7, the core rod sliding step was not carried out.

TABLE 3

|  | 3AS portion |
| --- | --- |
| Sample 5 | 90% |
| Sample 6 | 50% |
| Sample 7 | 25% |

For the respective samples 5 to 7 described above, the friction coefficients were measured. In the measurement, a sliding test was carried out by rotating the rotating shaft 2 in a state in which a load was applied to the central portion 3AS along the shaft line O of the first region 3A in the oil-impregnated sintered bearing 10 shown in FIG. 1, and the friction coefficient was computed. The measurement conditions are as described below.

1. Circumferential speed of rotating shaft 2: 100 m/min
2. Load: 1 MPa
3. Measurement environment temperature: Room temperature
4. Rotation time: 1800 seconds The results of the verification example 2 carried out under the above-described conditions are shown in Table 4 and FIG. 9.

TABLE 4

|  | Friction coefficient |
| --- | --- |
| Sample 5 | 0.061 |
| Sample 6 | 0.072 |
| Sample 7 | 0.110 |

Figure 9:
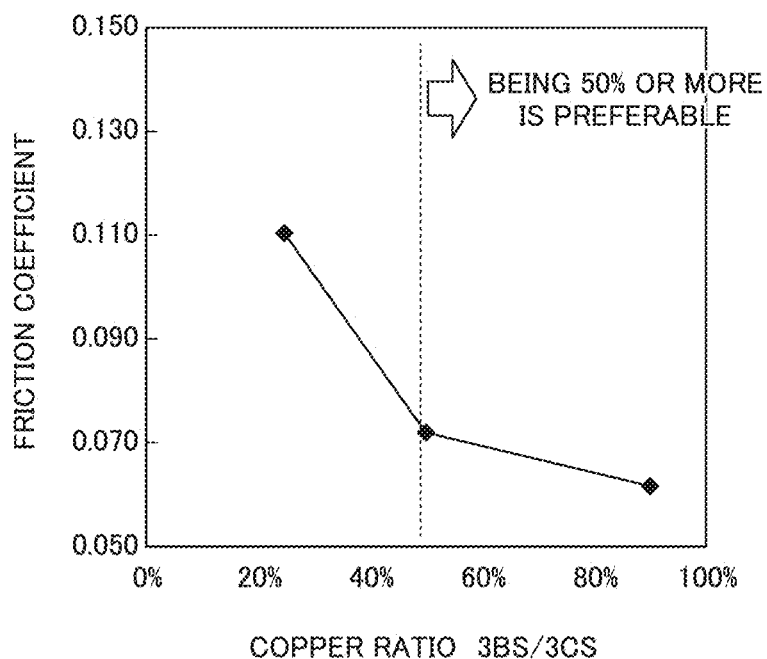
FIG. 9 is a graph showing results of a verification example 2.

According to the results of the verification example 2 shown in Table 4 and FIG. 9, it was confirmed that the friction coefficient of the sample 7 was significantly higher than those of the samples 5 and 6 and an effect for decreasing the friction coefficient could be obtained by setting the ratio of the Cu phase in the central portion 3AS in the oil-impregnated sintered bearing 10 shown in FIGS. 1 to 50% or more.

Verification Example 3

In the oil-impregnated sintered bearing 20 of the second embodiment shown in FIG. 2, the relationship between the angle (taper angle) θ1 formed by the inclined surface of the enlarged diameter portion 4b or 4c and the inner surface of the straight hole portion 4a and the friction coefficient was verified.

In the verification, an oil-impregnated sintered bearing having a taper angle θ1 of 0.1° was regarded as a sample 9, and an oil-impregnated sintered bearing having a taper angle θ1 of 4.0° was regarded as a sample 10. For the respective samples, clearance was adjusted to accordingly accelerate sliding in the enlarged diameter portions. For example, the clearance was set to approximately 10 μm in the sample 9 and set to approximately 70 μm in the sample 10. In addition, for comparison, an oil-impregnated sintered bearing in which the taper angle θ1 was 0°, that is, the same bearing hole 3 as in the first embodiment has a straight tube shape was regarded as a sample 8 (comparative example). The samples 8 to 10 were formed by loading a powder mixture in which the mixing ratio was set to Fe-20 wt % Cu-2 wt % Sn into a cavity, sliding a core rod vertically in the cavity along the vertical direction, pressing upper and lower punches fitted into the cavity, and sintering the powder mixture. For the samples 9 and 10, after the sintering, a sizing step was carried out so as to obtain the above-described taper angles, and shapes were imparted.

For the respective samples 8 to 10 described above, the friction coefficients were measured. In the measurement, a sliding test was carried out by rotating the rotating shaft 2 in a state in which, in the oil-impregnated sintered bearing 20 (the oil-impregnated sintered bearing 10 shown in FIG. 1 for the sample 8) shown in FIG. 2, a load was applied to a location 2 mm offset from the central portion 4AS (3AS) along the shaft line O of the first region 4A (3A) toward the central portion 4BS (3BS) along the shaft line O of the second region 4B (3B) and the core rod was slidden in the enlarged diameter portions 4b and 4c (for the samples 9 and 10), and the friction coefficient was computed. The measurement conditions are as described below.

1. Circumferential speed of rotating shaft 2: 100 m/min
2. Load: 1 MPa
3. Measurement environment temperature: Room temperature
4. Rotation time: 1800 seconds The results of the verification example 3 carried out under the above-described conditions are shown in Table 5 and FIG. 10.

TABLE 5

|  | θ1 (°) | Friction coefficient |
| --- | --- | --- |
| Sample 8 | 0 | 0.113 |
| Sample 9 | 0.1 | 0.109 |
| Sample 10 | 4.0 | 0.102 |

Figure 10:
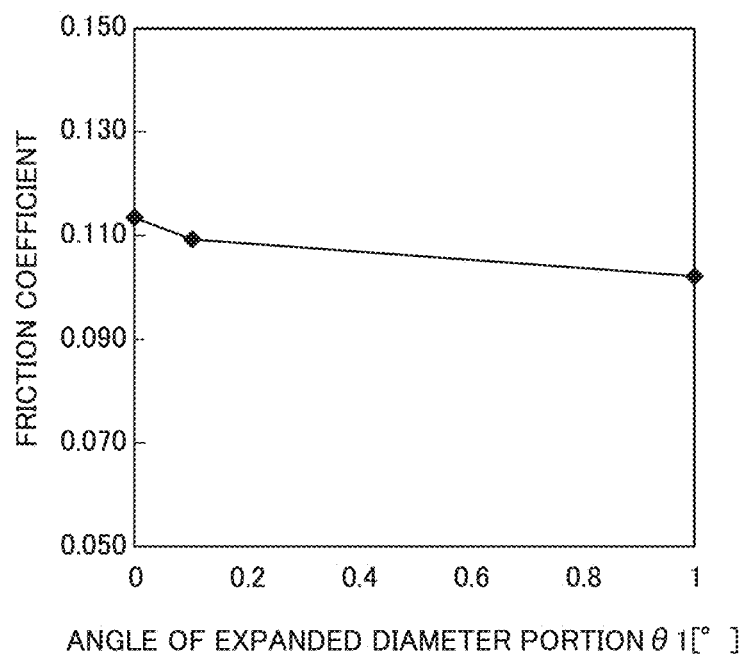
FIG. 10 is a graph showing results of a verification example 3.

According to the results of the verification example 3 shown in Table 5 and FIG. 10, it was confirmed that, when the bearing hole of the oil-impregnated sintered bearing is provided with a shape made up of the straight hole portion 4a and the enlarged diameter portions 4b and 4c, it is possible to more significantly decrease the friction coefficient compared with oil-impregnated sintered bearings in which the bearing hole is provided with a straight tube shape as a whole. In addition, it was confirmed that, as the angle of the taper angle θ1 increases, the friction coefficient can be further decreased.

Verification Example 4

Figure 11:
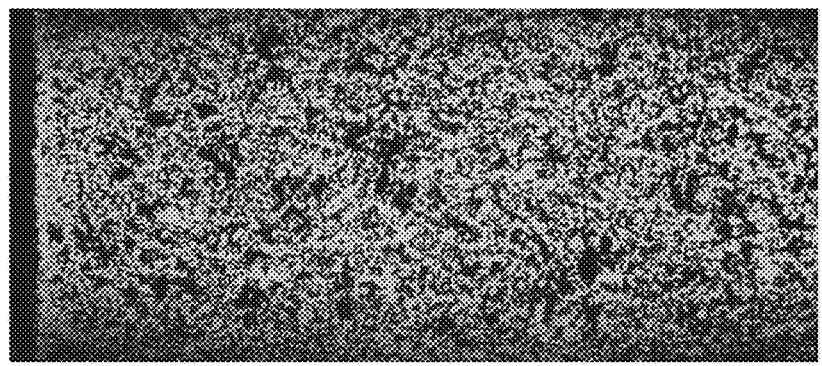
FIG. 11 is a main portion-enlarged photograph showing results (invention example) of a verification example 4.
Figure 11:
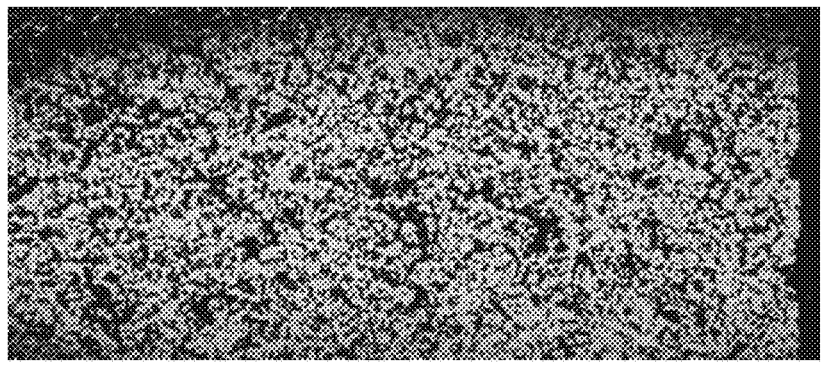

An enlarged photograph of the central portion 3BS along the shaft line O of the second region 3B and an enlarged photograph of the central portion 3CS along the shaft line O of the third region 3C in the bearing 10 shown in FIG. 1 are shown in FIG. 11.

Figure 12:
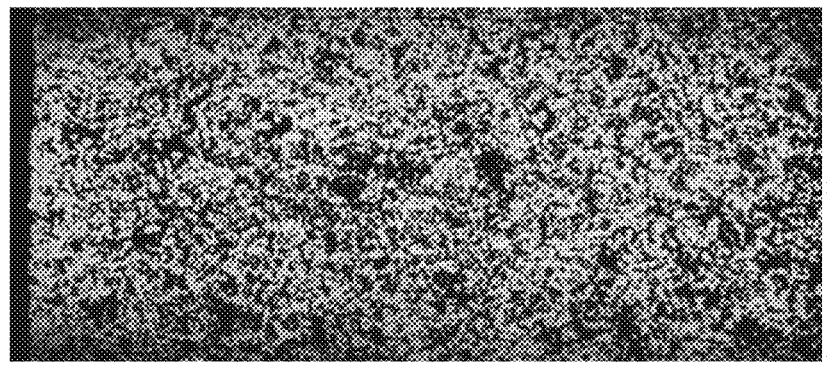
FIG. 12 is a main portion-enlarged photograph showing results (comparative example) of the verification example 4.
Figure 12:
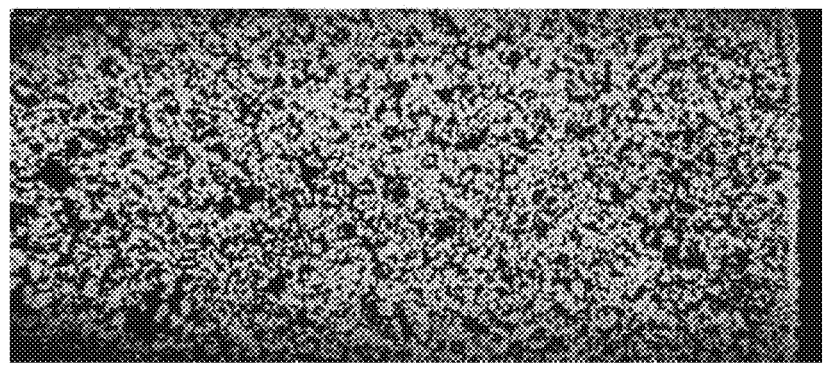

In addition, as a comparative example, an enlarged photograph of a location corresponding to the central portion 3BS along the shaft line O of the second region 3B and an enlarged photograph of a location corresponding to the central portion 3CS along the shaft line O of the third region 3C in a bearing for which the core rod sliding step was not carried out and the disposition of the Cu foil pieces was not adjusted are shown in FIG. 12.

In each of FIG. 11 and FIG. 12, the shaped Up side of the upper drawing shows the central portion 3CS of the third region 3C, and the shaped Lo side of the lower drawing shows the central portion 3BS of the second region 3B. Bright portions in the enlarged photographs show the Cu phase. In the bearing 10 and the bearing of the comparative example, a powder mixture in which the mixing ratio was set to Fe-20 wt % Cu-2 wt % Sn was used. On the bearing 10, the core rod sliding step was carried out.

According to the verification results shown in FIG. 11, in the bearing of the invention example, the area ratio of the Cu phase in the central portion 3CS of the third region 3C that were present in the upper side during the shaping was 60%, and the area ratio of the Cu phase in the central portion 3BS of the second region 3B that were present in the lower side during the shaping was 55%. From this result, it is assumed that the Cu phase did not significantly change through the entire inner circumferential surface S of the bearing hole 4.

According to the verification results shown in FIG. 12, in the bearing of the comparative example of the related art, the area ratio of the Cu phase in the central portion 3CS of the third region 3C that were present in the upper side during the shaping was 60%, and the area ratio of the Cu phase in the central portion 3BS of the second region 3B that were present in the lower side during the shaping was 40%. It was confirmed that the area ratios of the Cu phase significantly differed in the upper side and the lower side during the shaping in the inner circumferential surface S of the bearing hole 4.

INDUSTRIAL APPLICABILITY

According to the present invention, in oil-impregnated sintered bearings for which a Fe—Cu-based sintered metal including Cu-based flat raw material powder is used, it is possible to decrease the uneven distribution of a Cu phase in an inner circumferential surface of a bearing hole. Therefore, it is possible to enhance bearing performance in a slow rotation and high load state and bearing performance in a fast rotation and low load state to the maximum extent and obtain stabilized sliding properties.

REFERENCE SIGNS LIST

1 BEARING MAIN BODY (SINTERED BODY)
2 ROTATING SHAFT
3, 4, 6 BEARING HOLE
3A, 4A, 6A FIRST REGION
3B, 4B, 6B SECOND REGION
3C, 4C, 6C THIRD REGION
3A1, 4A1, 6A1 FIRST END PORTION
3A2, 4A2, 6A2 SECOND END PORTION
3E1, 4E1, 6E1 FIRST OPENING
3E2, 4E2, 6E2 SECOND OPENING
3AS, 4AS, 6AS CENTRAL PORTION OF THE FIRST REGION

3BS, 4BS, 6BS CENTRAL PORTION OF THE SECOND REGION
3CS, 4CS, 6CS CENTRAL PORTION OF THE THIRD REGION
4a, 6a STRAIGHT HOLE PORTION
4b, 4c, 6b, 6c ENLARGED DIAMETER PORTION
10, 20, 40 OIL-IMPREGNATED SINTERED BEARING (BEARING)
30 MOLD
31 DIE
32 UPPER PUNCH
33 LOWER PUNCH
34 CORE ROD
41 Fe POWDER
42 Cu POWDER
43 POWDER MIXTURE
CAVITY
S INNER CIRCUMFERENTIAL SURFACE

The invention claimed is:

1. An oil-impregnated sintered bearing comprising:
a Fe—Cu-based sintered body being impregnated with a lubricant, a bearing hole being formed in the Fe—Cu-based sintered body and configured to be penetrated by and support a rotating shaft,
wherein an inner circumferential surface of the bearing hole includes a first region forming a central portion in a shaft direction, a second region from a first end portion of the first region to a first opening of the bearing hole, and a third region from a second end portion of the first region to a second opening of the bearing hole,
in the second region and the third region, a Cu phase formed of Cu powder including Cu-based flat raw material powder is formed,
an area ratio of the Cu phase of the second region in a center along the shaft direction is 80% or more and 100% or less of an area ratio of the Cu phase of the third region in a center along the shaft direction,
the bearing hole includes: a straight hole portion that is formed in the first region and has a constant diameter; and a first enlarged diameter portion and a second enlarged diameter portion that are formed in the second region and the third region, respectively, continue from the straight hole portion, have a diameter that increases outwards, and form a tapered shape,
a first straight line, which is extended from an inclined surface of the enlarged diameter portion of the second region in an inclination direction toward the center of the bearing main body, and a second straight line, which extended from an inclined surface of the enlarged diameter portion of the third region located at an opposite corner relative to the inclined surface of the enlarged diameter portion of the second region in an inclination direction toward the center of the bearing main body, are disposed parallel to each other,
an interval between the first straight line and the second straight line is larger than a diameter of the rotating shaft,
in a case where an axis line of the rotating shaft is inclined in the oil-impregnated sintered bearing, the rotating shaft comes into contact with at least one of the enlarged diameter portions, and
the second region is in a lower side and the third region is in an upper side during shaping of the oil-impregnated sintered bearing.

2. The oil-impregnated sintered bearing according to claim 1,
wherein the Cu phase formed of Cu powder including Cu-based flat raw material powder is formed in the first region, and
an area occupied by the Cu phase relative to an area of the inner circumferential surface in the center along the shaft direction of the first region is 50% or more.

3. A production method for the oil-impregnated sintered bearing according to claim 1, the method comprising at least:
a material loading step of loading a powder mixture including an Fe powder and a Cu powder into a cavity of a mold from an upper side in a vertical direction;
a core rod sliding step of sliding a core rod that is configured to penetrate into the cavity and shape the bearing hole along the vertical direction in the cavity, and
a step of forming an enlarged diameter portion in each of the second region and the third region by enlarging diameters of the second region and the third region by performing sizing into a predetermined depth on each end of the bearing hole, wherein
the core rod sliding step is a step of collecting the Cu powder in a portion with which the core rod comes into contact in the cavity, and
Cu foil powder is used as the Cu powder.

* * * * *